United States Patent
Gambhir-Parekh (10) Patent No.: US 11,470,683 B2
(45) Date of Patent: Oct. 11, 2022

(54) IDLE MODE SIGNALING REDUCTION CORE OFFLOAD

(71) Applicant: Parallel Wireless, Inc., Nashua, NH (US)

(72) Inventor: Manisha Sameer Gambhir-Parekh, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/684,585

(22) Filed: Nov. 14, 2019

(65) Prior Publication Data

US 2020/0154516 A1     May 14, 2020

Related U.S. Application Data

(60) Provisional application No. 62/767,256, filed on Nov. 14, 2018.

(51) Int. Cl.
*H04W 84/04* (2009.01)
*H04W 8/08* (2009.01)
(Continued)

(52) U.S. Cl.
CPC ........... *H04W 84/045* (2013.01); *H04W 8/08* (2013.01); *H04W 36/0066* (2013.01);
(Continued)

(58) Field of Classification Search
CPC ... H04W 84/045; H04W 76/19; H04W 76/38; H04W 8/08; H04W 36/0066; H04W 36/08; H04W 36/12; H04W 36/32; H04W 36/36; H04W 40/248; H04W 60/04; H04W 88/16; H04W 36/0033; H04W 92/02; H04W 12/66
See application file for complete search history.

(56) References Cited

U.S. PATENT DOCUMENTS 6,528,974 B1    3/2003   Mirov et al.
6,608,476 B1    8/2003   Mirov et al.
(Continued)

FOREIGN PATENT DOCUMENTS

CN    101409901 A    4/2009
CN    101448305 A    6/2009
(Continued)

OTHER PUBLICATIONS

Ericsson, 5G cases, Discover 5G benefits through our 5G use cases: https://www.ericsson.com/en/5gluse-cases, Apr. 26, 2022.
(Continued)

*Primary Examiner* — Mewale A Ambaye
(74) *Attorney, Agent, or Firm* — Michael Y. Saji; David W. Rouille (57) ABSTRACT

Systems, methods and computer software are disclosed for supporting idle mode signaling reduction (ISR) core offload. In one embodiment a method includes providing an eNodeB co-located with a NodeB, and a User Equipment (UE) with ISR enabled; activating ISR when the UE goes idle and is switching between different Radio Access Technologies (RATs), and wherein UE connections are maintained with a Serving GPRS Support Node (SGSN) and a Mobility Management Entity (MME).

15 Claims, 5 Drawing Sheets

(51) Int. Cl.
*H04W 76/19* (2018.01)
*H04W 76/38* (2018.01)
*H04W 36/36* (2009.01)
*H04W 40/24* (2009.01)
*H04W 36/12* (2009.01)
*H04W 36/00* (2009.01)
*H04W 36/32* (2009.01)
*H04W 60/04* (2009.01)
*H04W 88/16* (2009.01)
*H04W 36/08* (2009.01)

(52) U.S. Cl.
CPC ........... *H04W 36/08* (2013.01); *H04W 36/12* (2013.01); *H04W 36/32* (2013.01); *H04W 36/36* (2013.01); *H04W 40/248* (2013.01); *H04W 60/04* (2013.01); *H04W 76/19* (2018.02); *H04W 76/38* (2018.02); *H04W 88/16* (2013.01)

(56) References Cited

U.S. PATENT DOCUMENTS

| | | |
|---|---|---|
| 6,748,546 B1 | 6/2004 | Mirov et al. |
| 7,133,702 B2 | 11/2006 | Amerga et al. |
| 7,391,803 B2 | 6/2008 | He et al. |
| 9,801,094 B2 | 10/2017 | Rajagopal et al. |
| 10,771,961 B2* | 9/2020 | Lee ............ H04W 4/029 |
| 2007/0087767 A1 | 4/2007 | Pareek et al. |
| 2007/0140159 A1 | 6/2007 | Eronen et al. |
| 2009/0258607 A1 | 10/2009 | Beninghaus et al. |
| 2010/0056146 A1 | 3/2010 | Guo et al. |
| 2010/0064038 A1 | 3/2010 | Hu |
| 2010/0124223 A1 | 5/2010 | Gibbs et al. |
| 2010/0317347 A1 | 12/2010 | Burbidge et al. |
| 2011/0170517 A1* | 7/2011 | Bakker ............ H04W 36/0033 370/331 |
| 2011/0171953 A1* | 7/2011 | Faccin ............ H04W 48/08 455/426.1 |
| 2012/0076047 A1 | 3/2012 | Turanyi et al. |
| 2012/0076121 A1* | 3/2012 | Choi ............ H04W 60/005 370/338 |
| 2012/0120789 A1 | 5/2012 | Ramachandran et al. |
| 2012/0300750 A1 | 11/2012 | Chin et al. |
| 2012/0307732 A1* | 12/2012 | Olsson ............ H04W 64/00 370/328 |
| 2013/0039244 A1 | 2/2013 | Sun |
| 2013/0053031 A1 | 2/2013 | Widjaja et al. |
| 2013/0083773 A1 | 4/2013 | Watfa et al. |
| 2013/0157661 A1 | 6/2013 | Bhaskaran et al. |
| 2013/0337850 A1 | 12/2013 | Ljung |
| 2014/0016614 A1 | 1/2014 | Velev et al. |
| 2014/0105028 A1 | 4/2014 | Bhaskaran et al. |
| 2014/0349662 A1 | 11/2014 | Ekici et al. |
| 2015/0173121 A1 | 6/2015 | Miklos et al. |
| 2015/0201394 A1 | 7/2015 | Qu et al. |
| 2016/0286434 A1 | 9/2016 | Noldus |
| 2018/0152865 A1* | 5/2018 | Atri ............ H04W 36/30 |
| 2018/0184311 A1 | 6/2018 | Fiaschi et al. |
| 2020/0267790 A1* | 8/2020 | Kim ............ H04W 48/16 |
| 2020/0323019 A1* | 10/2020 | Vargas ............ H04B 1/0064 |

FOREIGN PATENT DOCUMENTS

| | | |
|---|---|---|
| CN | 101572943 A | 11/2009 |
| CN | 102098655 A | 6/2011 |
| JP | 2011527537 A | 10/2011 |
| WO | 2009152861 A1 | 12/2009 |

OTHER PUBLICATIONS

Da Silva et al.: 2016 IEEE International Conference on Communications Workshops (ICC), A novel state model for 5G Radio Access Networks, May 23-27, 2016.
3GPP TSG RAN WG2 Meeting #94, May 23-27, 2016.
3rd Generation Partnership Project; Technical Specification Group Radio Access Network; NR; NR and NG-RAN Overall Description; Stage 2 (Release 15), 3GPP TS 38.300 V1.0.0 (Sep. 2017).
3rd Generation Partnership Project; Technical Specification Group Radio Access Network; NR; Radio Resource Control (RRC); Protocol specification (Release 15), 3GPP TS 38.331 V0.0.2 (Mar. 2017).
Da Silva et al.: "5G Latency Requirements with Inactive State", Ericsson Technology Review, Jun. 19, 2019.

* cited by examiner

IDLE MODE SIGNALING REDUCTION CORE OFFLOAD

CROSS-REFERENCE TO RELATED APPLICATIONS

This application claims priority under 35 U.S.C. § 119(e) to U.S. Provisional Pat. App. No. 62/767,256, filed Nov. 14, 2018, titled "ISR Support at HNG When eNodeB and NodeB are Co-Located" which is hereby incorporated by reference in its entirety for all purposes. This application also hereby incorporates by reference U.S. patent application Ser. No. 15/241,060, entitled "Cell ID Disambiguation" and filed Aug. 18, 2016, which itself is a non-provisional conversion of, and claims the benefit of priority under 35 U.S.C. § 119(e) to U.S. Provisional Pat. App. No. 62/206,666, filed Aug. 18, 2015 with title "Cell ID Disambiguation," each hereby incorporated by reference in its entirety. As well, U.S. Pat. No. 8,867,418 and U.S. Pat. App. No. 20140133456 are also hereby incorporated by reference in their entireties. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584.

This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

This application also hereby incorporates by reference in their entirety each of the following U.S. Pat. applications or Pat. App. Publications: US20180242396A1; US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

Features and characteristics of and pertaining to the systems and methods described in the present disclosure, including details of the multi-RAT nodes and the gateway described herein, are provided in the documents incorporated by reference

BACKGROUND

Idle state Signaling Reduction (ISR) aims at reducing the frequency of Tracking Area update (TAU) and Routing Area Updates (RAU) procedures caused by User Equipments (UEs) reselecting between Evolved-UMTS Terrestrial Radio Access Network (E-UTRAN) and GSM Edge Radio Access Network (GERAN)/UMTS Terrestrial Radio Access Network (UTRAN) which are operated together. Especially the update signaling between UE and network is reduced. But also network internal signaling is reduced. To some extent the reduction of network internal signaling is also available when ISR is not used or not activated by the network.

SUMMARY

A system is disclosed to support Idle state Signaling Reduction (ISR) at a HetNet Gateway (HNG) when eNodeB and NodeB are co-located. ISR is mandatory for a UE that supports both 3G/2G and 4G but is optional for core network. When a UE with ISR feature is connected to a HNG, the HNG can activate this feature when the UE goes idle and is switching between LTE and 3G/2G. Since this feature is optional at the core, ISR at the HNG will help in reducing the frequency of TAU and RAU procedures if the core does not support it. Similarly, this feature reduces the paging procedures from a Mobility Management Entity (MME) and a Serving GPRS Support Node (SGSN).

In one example embodiment, a method may be disclosed for supporting idle mode signaling reduction (ISR) core offload. The method includes providing an eNodeB co-located with a NodeB, and a User Equipment (UE) with ISR enabled; activating ISR when the UE goes idle and is switching between different Radio Access Technologies (RATs), and maintaining UE connections with a Serving GPRS Support Node (SGSN) and a Mobility Management Entity (MME).

In another example embodiment a system for supporting idle mode signaling reduction (ISR) core offload includes an eNodeB co-located with a NodeB; a User Equipment (UE) with ISR enabled; wherein ISR is activated when the UE goes idle and is switching between different Radio Access Technologies (RATs), and maintains UE connections with a Serving GPRS Support Node (SGSN) and a Mobility Management Entity (MME).

In another example embodiment, a non-transitory computer-readable medium contains instructions for supporting idle mode signaling reduction (ISR) core offload which, when executed, causes a system to perform steps including providing an eNodeB co-located with a NodeB, and a User Equipment (UE) with ISR enabled; activating ISR when the UE goes idle and is switching between different Radio Access Technologies (RATs), and maintaining UE connections with a Serving GPRS Support Node (SGSN) and a Mobility Management Entity (MME).

DETAILED DESCRIPTION

ISR enables signaling reduction with separate SGSN and MME and also with independent TAs and RAs. Thereby the interdependency is drastically minimized compared with the GERAN/UTRAN RAs. This comes however with ISR specific node and interface functionality. SGSN and MME may be implemented together, which reduces some interface functions but results also in some dependencies.

ISR support is mandatory for E-UTRAN UEs that support GERAN and/or UTRAN and optional for the network. ISR requires special functionality in both the UE and the network (i.e. in the SGSN, MME and Serving Gateway (SGW)) to activate ISR for a UE. For this activation, the MME/SGSN detects whether SGW supports ISR based on the configuration and activates ISR only if the SGW supports the ISR. The network can decide for ISR activation individually for each UE.

Figure 1:
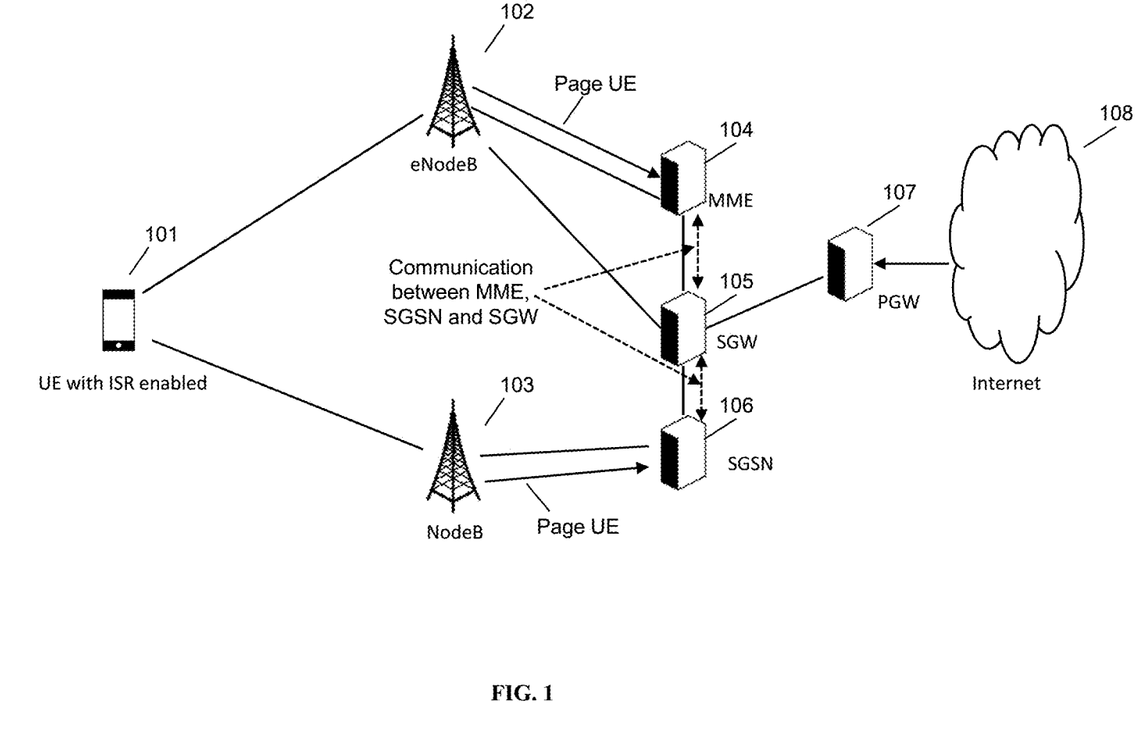
FIG. 1 is a prior art system diagram showing ISR enabled UE connections.

FIG. 1 shows a system with ISR enabled UE connections. In FIG. 1 UE 101 is ISR enabled. UE 101 is in communication with eNodeB 102 and with NodeB 103. eNodeB 102 is in communication with MME 104 and with SGW 105. NodeB 103 is in communication with SGSN 106. SGW 105 is in communication with MME 104 and with SGSN 106. SGW 105 is in communication PGW 107. PGW 107 is in communication with Internet 108.

When ISR is activated this means the UE is registered with both MME and SGSN. Both the SGSN and the MME have a control connection with the SGW. MME and SGSN are both registered at a Home Subscriber Server (HSS). The UE stores MM parameters from SGSN (e.g. Packet Temporary Mobile Subscriber Identity (P-TMSI) and RA) and from MME (e.g. Globally Unique Temporary Identifier (GUTI) and TA(s)) and the UE stores session management (bearer) contexts that are common for E-UTRAN and GERAN/UTRAN accesses. In idle state the UE can reselect between E-UTRAN and GERAN/UTRAN (within the registered RA and TAs) without any need to perform TAU or RAU procedures with the network. SGSN and MME store each other's address when ISR is activated.

When ISR is activated and downlink data arrives, the SGW initiates paging processes on both SGSN and MME. In response to paging or for uplink data transfer the UE performs normal Service Request procedures on the currently camped-on RAT without any preceding update signaling.

Figure 2:
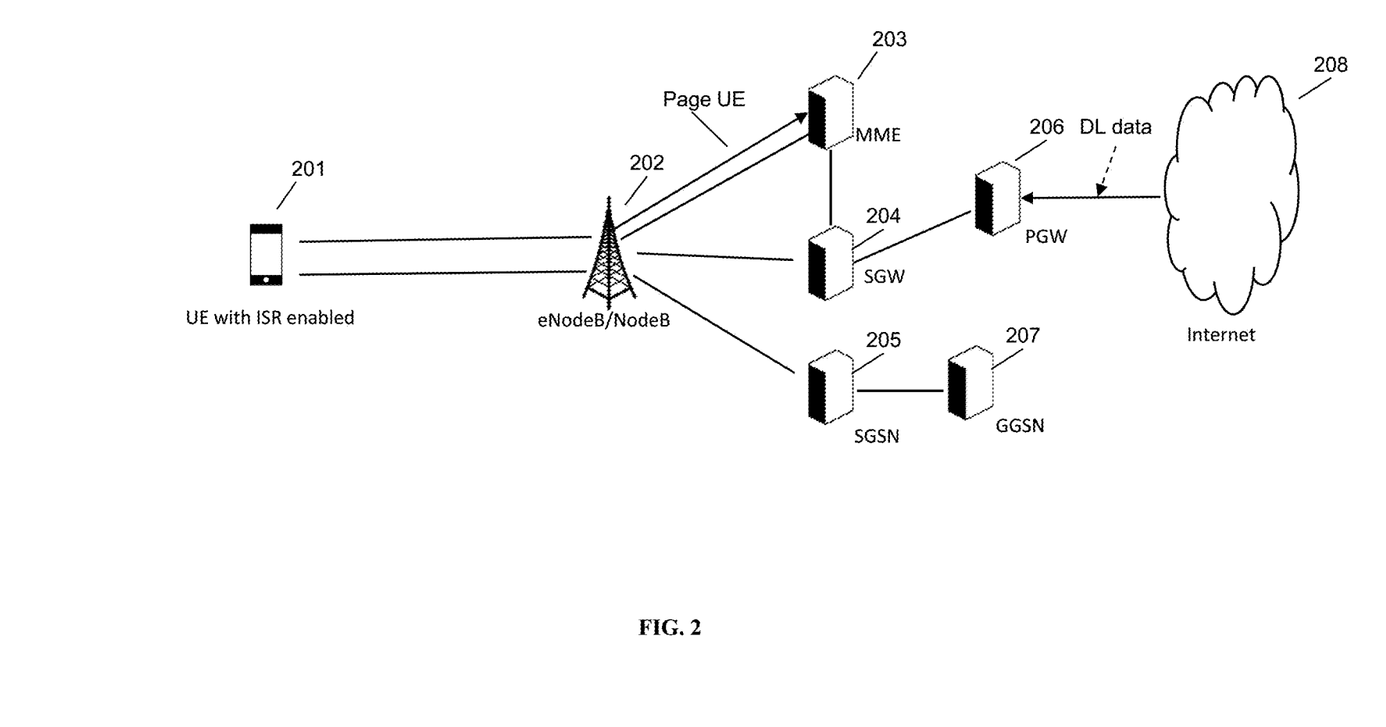
FIG. 2 is a system diagram showing ISR enabled UE connections with eNodeB and NodeB co-located, in accordance with some embodiments.

FIG. 2 shows a system with ISR enabled UE connections with eNodeB and NodeB co-located. In FIG. 2 UE 201 is ISR enabled. UE 201 is in communication with eNodeB/NodeB 202. eNodeB/NodeB 202 is in communication with MME 203, SGW 204, and with SGSN 205. SGW 204 is in communication with MME 203 and with SGSN 205. SGSN 205 is in communication with GGSN 207. SGW 105 is in communication PGW 206. PGW 206 is in communication with Internet 208.

The following is needed to support ISR:

UTRAN needs S4 SGSN to support ISR. Not all SGSN nodes have this support. The UE needs to keep on reselecting between UTRAN and EUTRAN and UE needs to keep on registering with the network when the coverage is not there. Thus, the call setup and handover time increases.

If the core supports ISR on UTRAN and EUTRAN, SGW will send notifications to both the nodes every time downlink data is received. MME and SGSN in turn send paging notification to all the eNodeB and NodeB respective. This signaling involved between MME, SGSN and SGW in locating the UE results in using both the network resources when UE is present in one network.

When a UE switching between LTE and 3G is anchored on an HNG, the HNG can decide to support ISR if core does not support it. This helps in reducing the setup time when UE switches between these networks. Expiry of periodic TAU timers or periodic RAU timer or periodic LAU timer will not cause the UE to change Radio Access technology (RAT). The HNG maintains UE connections with the SGSN and well as the MME when the UE supports ISR. When the SGW gets a downlink packet, SGW sends the notification to either SGSN or MME. HNG will establish the session with MME/SGSN depending on the UE, and the UE gets connected to the core again.

ISR support in HNG will enable UTRAN without the S4 SGSN support to achieve the goal of doing away with the call setup and handover thus eliminating the need of having S4 SGSN support in UTRAN.

If the core supports ISR, enabling ISR at HNG helps offloading the core communication between node when data is received by core. Paging and SGSN and MME communication require network resources not only at SGSN and MME but also in both the networks, EnodeBs and NodeBs. This would also help UE in maintaining less connections with different core nodes thus saving on UE battery power. This will help in saving network resources at various nodes as well as network signaling.

Since HNG can collocate NodeB and eNodeB, this can be achieved.

At a coordinating server (HNG), virtualized eNodeB and NodeB stateful virtual network functions (services) can co-exist. Consider a scenario where, a UE which supports ISR, is switching between either eNodeB/NodeB on same HNG. The eNodeB+NodeB can work to support ISR feature irrespective of core network supporting it. HNG will keep the connections with MME and SGSN alive until a Paging request is received by either eNodeB or NodeB by forwarding the periodic messages sent by UE to both. When HNG receives paging request from either of the nodes, HNG then can check where the UE is and page accordingly. This enables even if the core does not support ISR, eNodeB and NodeB can support it, thus reducing the initial signaling needed for call setup/handover etc. Complexity at core is reduced since eNodeB/NodeB has taken over the functionality. And of course, UE saves on battery.

In some embodiments, expiry of periodic TAU, RAU, or LAU timers, or any other timers, including while UE is inactive, will not cause UE to change RAT.

Figure 3:
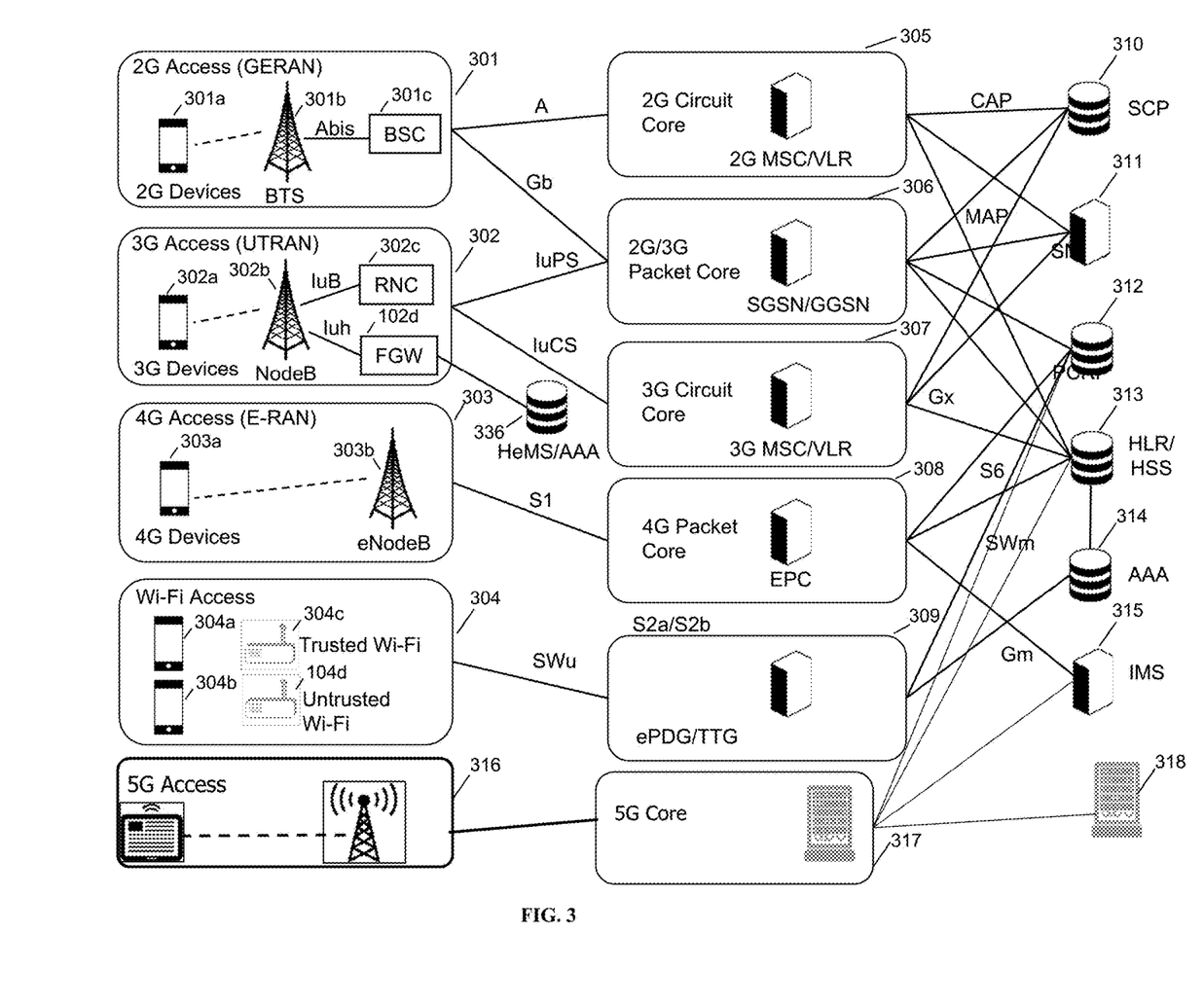
FIG. 3 is a schematic network architecture diagram for 3G and other-G networks.

FIG. 3 is a schematic network architecture diagram for 3G and other-G prior art networks. The diagram shows a plurality of "Gs," including 2G, 3G, 4G, 5G and Wi-Fi. 2G is represented by GERAN 301, which includes a 2G device 301a, BTS 301b, and BSC 301c. 3G is represented by UTRAN 302, which includes a 3G UE 302a, nodeB 302b, RNC 302c, and femto gateway (FGW, which in 3GPP namespace is also known as a Home nodeB Gateway or HNBGW) 302d. 4G is represented by EUTRAN or E-RAN 303, which includes an LTE UE 303a and LTE eNodeB 303b. Wi-Fi is represented by Wi-Fi access network 304, which includes a trusted Wi-Fi access point 304c and an untrusted Wi-Fi access point 304d. The Wi-Fi devices 304a and 304b may access either AP 304c or 304d. In the current network architecture, each "G" has a core network. 2G circuit core network 305 includes a 2G MSC/VLR; 2G/3G packet core network 306 includes an SGSN/GGSN (for EDGE or UMTS packet traffic); 3G circuit core 307 includes a 3G MSC/VLR; 4G circuit core 308 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 330, the SMSC 331, PCRF 332, HLR/HSS 333, Authentication, Authorization, and Accounting server (AAA) 334, and IP Multimedia Subsystem (IMS) 335. An HeMS/AAA 336 is present in some cases for use by the 3G UTRAN. The diagram is used to indicate schematically the basic functions of each network as known to one of skill in the art, and is not intended to be exhaustive. For example, 5G core 317 is shown using a single interface to 5G access 316, although in some cases 5G access can be supported using dual connectivity or via a non-standalone deployment architecture.

Noteworthy is that the RANs 301, 302, 303, 304 and 336 rely on specialized core networks 305, 306, 307, 308, 309, 337 but share essential management databases 330, 331, 332, 333, 334, 335, 338. More specifically, for the 2G GERAN, a BSC 301c is required for Abis compatibility with BTS 301b, while for the 3G UTRAN, an RNC 302c is required for Iub compatibility and an FGW 302d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 4:
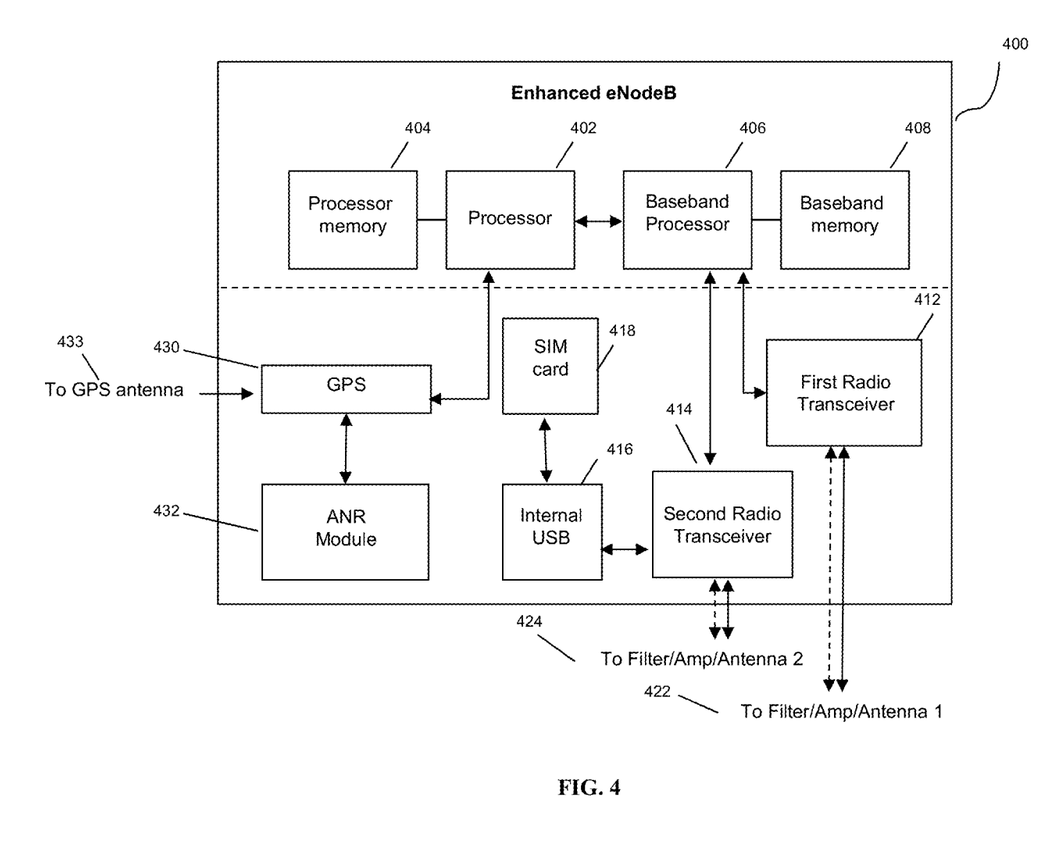
FIG. 4 is an enhanced eNodeB for performing the methods described herein, in accordance with some embodiments.

FIG. 4 is an enhanced base station for performing the methods described herein, in accordance with some embodiments. Base station 400 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber information module card (SIM card) 418 coupled to USB port 416. In some embodiments, the second radio transceiver 414 itself may be coupled to USB port 416, and communications from the baseband processor may be passed through USB port 416. The second radio transceiver may be used for wirelessly backhauling eNodeB 400.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be 3G, 4G, 5G, Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

A GPS module 430 may also be included, and may be in communication with a GPS antenna 432 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 432 may also be present and may run on processor 402 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 5:
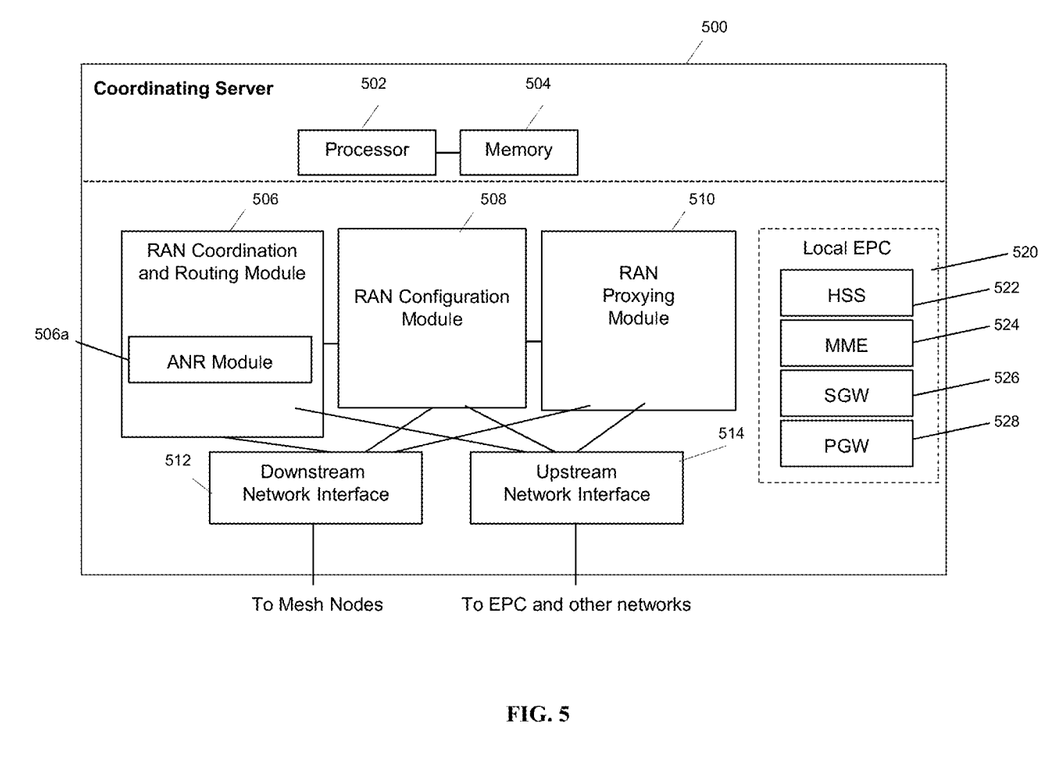
FIG. 5 is a coordinating server for providing services and performing methods as described herein, in accordance with some embodiments.

FIG. 5 is a coordinating server for providing services and performing methods as described herein, in accordance with some embodiments. Coordinating server 500 includes processor 502 and memory 504, which are conFIG.d to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, RAU or TAU messages may no longer be needed because coordination is happening between the eNodeB and the nodeB. In some embodiments, the UE may receive messages from the core network (of any particular RAT that it is presently attached to) indicating that an ISR procedure has been performed, even though no TAU or RAU or other ISR message has been sent.

Wherever a core network node is described herein, the use of a virtualized network function may be contemplated instead of or in conjunction with a traditional core network node. For example, a virtual RNC or virtual MME may be used. For example, containerized network functions can be used that support a subset of the available resources and/or users at a particular time. Virtual network functions can be in containers, in virtual machines, private cloud, public cloud, on- or off-premises, etc. In some embodiments, virtual network functions may be networked together using private IP networks or other networks, and may use these networking communications channels for private communications according to or not according to 3GPP standard interfaces. In some embodiments, other communications channels may be used between network functions, up to and including shared access to memory.

In some embodiments, the word "colocated" can be used to describe the colocation of virtual network functions. For example, a plurality of base stations may be virtualized toward the core network by a coordinating server (HNG), which represents all of the plurality of base stations toward the core network as a single eNodeB. If a plurality of base stations of one RAT (e.g., 3G) and also a second plurality of base stations of another RAT (e.g., 4G) are both virtualized toward the core network using a single coordinating server, the coordinating server can be considered to co-locate the base station virtual functions of the two RATs. This is enabled by instantiating virtual network functions at the coordinating server for each RAT, and by using a stateful proxy at the coordinating server to provide consistent messaging toward both the core network and the UE to make both core network and UE interpret the communications of the plurality of base stations as coming from a single base station. This may be performed as further described herein and in the documents incorporated by reference herein. In such an instance, with the RAT virtualizing functions located at the same HNG, the RAT virtualizing functions can communicate with each other using a variety of interfaces and protocols, as described elsewhere herein and to provide the benefits described herein. In some embodiments, as the HNG is virtualizing the core network toward the UE, the HNG may report to the UE that the core network supports ISR when ISR is not supported by the core network (e.g., the MME/SGW/PGW of the LTE core); and the HNG may report to the UE that ISR procedures have been followed where in fact the ISR has been transparently facilitated by the HNG itself.

In some embodiments, a single HNG may be spread out over multiple servers, or even physical locations, and tied together using virtual memory and/or network connections, but this shall still be understood to be "co-located" for purposes of the present disclosure.

Wherever 3G and 4G radio access technologies (RATs) are discussed herein, it is understood that the present disclosure could be adapted to combinations of other RATs as well, for example, 3G and 5G, 4G and 5G, 4G and Wi-Fi, etc. For example, 5G introduces a new state, INACTIVE, as well as IDLE and CONNECTED, which are known in LTE, a new state, Rel-13 Suspend, that is used in LTE as well, and also two new messages, Suspend and Resume, that go along with these new states. When the UE is in the inactive or suspend states, it is able to move around within a limited area without updating the core network. In some embodiments, where a 4G and 5G core are colocated and the UE has moved from a 4G RAT to a 5G RAT (or vice versa), instead of signaling caused by the UE moving to CONNECTED state being performed between the 5G core and 4G core, the signaling can be absorbed between the core networks and the new serving node RAT can send a message to the UE indicating that all core network signaling is complete, without sending and receiving ISR messages between the cores.

The disclosed method does not require two nodes to be co-located, although that is the main use case. The disclosed method could be used with any two nodes as long as they are both managed at the same HNG (e.g., cloud coordination server or gateway). The HNG acts to provide ISR functionality even for core network nodes that do not support it, abstracting the core from the base station nodes. As well, a virtualized base station, virtual base station, containerized or virtual machine base station, etc. could also benefit from the disclosed method. As well, a variety of cores (MOCN, 2G/3G/4G/5G cores, etc.) could all be virtualized according to the disclosed method to present an ISR-compatible interface towards the base station.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for supporting idle mode signaling reduction (ISR) core offload by an eNodeB co-located with a NodeB, comprising:
   providing an eNodeB co-located with a NodeB,
   activating ISR when a UE with ISR enabled and in communication with the eNodeB and NodeB goes idle and is switching between different Radio Access Technologies (RATs),
   maintaining, by the eNodeB and NodeB, UE connections with a Serving General Packet Radio Services (GPRS) Support Node (SGSN) and a Mobility Management Entity (MME), wherein the eNodeB and co-located NodeB are in communication with each other regarding the UE;
   thereby allowing the UE to refrain from changing RATs due to expiration of a timer.

2. The method of claim 1 wherein the different RATs include at least two of Long-Term Evolution (LTE), 2G, 3G, 4G and 5G.

3. The method of claim 1 further comprising:
   receiving, by a Serving Gateway (SGW), a downlink packet;
   sending, by the SGW, notification to the SGSN,
   establishing, by the SGSN, a session: and
   wherein the UE gets connected to the core again.

4. The method of claim 1 further comprising:
   receiving, by a Serving Gateway (SGW), a downlink packet;
   sending, by the SGW, notification to the MME,
   establishing, by the MME, a session: and
   wherein the UE gets connected to the core again.

5. The method of claim 1, wherein the periodic timer is one of a Tracking Area Update (TAU) timer, a Routing Area Update (RAU) timer, and a Local Area Update (LAU) timer.

6. A system for supporting idle mode signaling reduction (ISR) core offload by an eNodeB co-located with a NodeB, comprising:
   an eNodeB co-located with a NodeB; and
   a User Equipment (UE) with ISR enabled in wireless communication with the eNodeB co-located with the NodeB;
   wherein ISR is activated when the UE goes idle and is switching between different Radio Access Technologies (RATs), and wherein UE connections with a Serving GPRS Support Node (SGSN) and a Mobility Management Entity (MME) are maintained, and wherein the eNodeB and the NodeB are in communication with each other regarding the UE;

thereby allowing the UE to refrain from changing RATs due to expiration of a timer.

7. The system of claim 6 wherein the different RATs include at least two of Long-Term Evolution (LTE), 2G, 3G, 4G and 5G.

8. The system of claim 6 wherein a Serving Gateway (SGW) receives a downlink packet and sends notification to the SGSN, wherein the SGSN establishes a session and wherein the UE gets connected to the core again.

9. The system of claim 6 wherein a Serving Gateway (SGW) receives a downlink packet and sends notification to the MME, wherein the MME establishes a session and wherein the UE gets connected to the core again.

10. The system of claim 6 wherein the periodic timer is one of a Tracking Area Update (TAU) timer, a Routing Area Update (RAU) timer, and a Local Area Update (LAU) timer.

11. A non-transitory computer-readable medium containing instructions for supporting idle mode signaling reduction (ISR) core offload which, when executed by a system, cause the system to perform steps comprising:

providing an eNodeB co-located with a NodeB, activating ISR when a UE with ISR enabled and in communication with the eNodeB and NodeB goes idle and is switching between different Radio Access Technologies (RATs), and maintaining, by the eNodeB and NodeB, UE connections with a Serving General Packet Radio Services (GPRS) Support Node (SGSN) and a Mobility Management Entity (MME), wherein the eNodeB and co-located NodeB are in communication with each other regarding the UE;

thereby enabling the UE to refrain from changing RATs due to expiration of a timer.

12. The non-transitory computer-readable medium of claim 11 further including instructions wherein the different RATs include at least two of Long-Term Evolution (LTE), 2G, 3G, 4G and 5G.

13. The non-transitory computer-readable medium of claim 11 further including instructions for:

receiving, by a Serving Gateway (SGW), a downlink packet;

sending, by the SGW, notification to the SGSN, establishing, by the SGSN, a session: and wherein the UE gets connected to the core again.

14. The non-transitory computer-readable medium of claim 11 further including instructions for:

receiving, by a Serving Gateway (SGW), a downlink packet;

sending, by the SGW, notification to the MME, establishing, by the MME, a session: and wherein the UE gets connected to the core again.

15. The non-transitory computer-readable medium of claim 11 further including instructions wherein the periodic timer is one of a Tracking Area Update (TAU) timer, a Routing Area Update (RAU) timer, and a Local Area Update (LAU) timer.

* * * * *